United States Patent [19]

Burghoff et al.

[11] 4,356,737
[45] Nov. 2, 1982

[54] DEVICE FOR THE ROTATING ACTUATION OF LINEARLY ACTUATED CONTROL ELEMENTS

[75] Inventors: Karl Burghoff, Oberursel; Ottmar Supper, Sindelfingen; Hans Trube, Herrenberg, all of Fed. Rep. of Germany

[73] Assignees: Max Kammerer GmbH, Oberursel; Daimler-Benz Aktiengesellschaft, Stuttgart, both of Fed. Rep. of Germany

[21] Appl. No.: 121,485

[22] Filed: Feb. 14, 1980

[30] Foreign Application Priority Data

Feb. 14, 1979 [DE] Fed. Rep. of Germany ....... 2905568

[51] Int. Cl.³ .............................................. F16C 1/10
[52] U.S. Cl. .................................... 74/501 R; 74/506
[58] Field of Search ............................... 74/501 R, 506

[56] References Cited

U.S. PATENT DOCUMENTS

| | | | |
|---|---|---|---|
| 1,291,406 | 1/1919 | Chaplin | 74/501 |
| 1,911,470 | 5/1933 | Rosner | 74/501 |
| 2,388,241 | 11/1945 | Arens | 74/501 |
| 2,441,719 | 5/1948 | Potter | 74/501 |

FOREIGN PATENT DOCUMENTS

| | | | |
|---|---|---|---|
| 2405321 | 8/1975 | Fed. Rep. of Germany | 74/501 R |
| 60263 | 5/1950 | France | 74/501 |
| 1064982 | 10/1952 | France | 74/501 |

*Primary Examiner*—Kenneth Dorner
*Attorney, Agent, or Firm*—Schwartz, Jeffery, Schwaab, Mack, Blumenthal & Koch

[57] ABSTRACT

An actuation device for use with a linearly actuated control element. The actuation device comprises a take-up body, a housing enclosing the take-up body, a shaft extending outwardly of the housing for rotating the take-up body, a flexible tension and compression element secured at one end thereof to the take-up body and a tube member extending outwardly of the housing and enclosing at least a part of the tension and compression element. The tension and compression element comprises a flexible guide strand and a plurality of elongated, rounded compression bodies wherein each compression body is threaded onto the flexible guide strand and positioned closely adjacent one another to form a tight packing.

7 Claims, 7 Drawing Figures

(A-B)

DEVICE FOR THE ROTATING ACTUATION OF LINEARLY ACTUATED CONTROL ELEMENTS

BACKGROUND OF THE INVENTION

1. Field of the Invention

The invention is in the field of linearly actuated control devices which are directly actuated, or indirectly actuated by means of Bowden cables, and used, for example, in switching, regulating or steering devices.

2. Description of the Prior Art

A known device of the prior art consists of a take-up body which is supported in a circular, closed housing and actuated by means of an outwardly protruding axle. The device has a flexible tension and compression element which is fastened on one end to the take-up body and guided within in an annular shape formed between the take-up body and the housing and within a tube which extends tangentially outwardly from the annular space. In this known device, the take-up body is formed by a ratchet wheel, and the flexible tension and compression element comprises a flexible wire carrying spherical bodies fastened on the wire at distances corresponding to the distribution of the teeth of the ratchet wheel, so that the spheres are located in the circular recesses formed by the teeth.

A disadvantage of this prior art device is that it is limited in transmitting compressive forces to a value determined by the flexural rigidity of the wire insert which is a relatively low value. If this value is exceeded, the tension and compression element will buckle in the runout zone not supported by the ratchet wheel, namely, at points between the spherical elements, thus leading to the destruction of the entire actuating device.

A further disadvantage of this prior art device consists of the fact that the flexibility of the tension and compression element is strongly affected by the stationary connection of the spherical elements which is functionally necessary for operation of the device. This fixed connection of the spherical elements blocks approximately three-fourths of the overall length of the tension and compression element, so that these parts do not participate in the bending of the element. This arrangement sets a natural lower limit of the dimensions of the actuating device.

SUMMARY OF THE INVENTION

It is the object of the present invention to provide a device for the rotating actuation of linearly actuated control elements of the above-described type which is not restricted with respect to the magnitude of the compressive force that may be transmitted and which further makes it possible to reduce the size of the device below the dimensions of the prior art. In accordance with the principles of the invention, the flexible tension and compression element comprises an arbitrary number of successively arranged, elongatedly rounded pressure bodies, threaded in a freely sliding manner onto a flexible guide strand in an axially tight packing.

The invention provides a rotating actuating device for linearly actuated control elements, whereby the functions of the transmission of compressive forces and of tensile forces are separated by design, so that the flexible guide strand carrying the pressure bodies is not involved in the transmission of compressive forces but serves only to transmit tensile forces, while conversely, the spherical bodies, acting merely as pressure elements, do not participate in the transmission of tensile forces. In this manner, the guide strand may consist of a highly flexible material without flexural rigidity, for example a synthetic textile material, so that consequently, the tension and compression element may be passed around a take-up body with a substantially smaller bending radius, whereby, because of the loose threading of the pressure bodies on the guide strand, flexibility is not affected. The necessary guidance of the strand when transmitting tensile forces takes place in the bores of the pressure bodies which are tightly packed. A further advantage consists of the fact that the flexible guide strand may fold together freely in the bores of the pressure bodies and that therefore the pressure bodies are also able to slide together into their tightest packing, thus affording practically unlimited transmission of compressive forces.

The pressure bodies may consist of barrel shaped cylindrical bodies rounded on all sides, whereby the rounded surfaces provided an adaptation of the cylindrical mantle surfaces of the bodies to the round contours of the circular housing, and further, enable gliding without friction, of adjacent cylindrical front surfaces of the bodies during the sliding of the bodies from the circular path into the elongated path. In order to further reduce the sliding friction inherent in the system between the pressure bodies and the housing, the pressure bodies may be provided in their cylindrical mantle surfaces with longitudinal fluting. In another embodiment of the invention, the pressure bodies may consist of rectangular bodies rounded on all sides in the manner of a cushion, which assures improved guidance while preventing the axial rotation of the compression bodies and makes feasible an arbitrary increase in the magnitude of the compression force that may be transmitted. In this embodiment, in place of a single, centrally positioned guide strand, two or more guide strands may be provided, resulting in a corresponding increase in the permissible tensile force. The flexible tensile and compressive element is connected with the control element or the Bowden cable in a known manner, wherein advantageously a connecting part rotatable on the guide strand is provided, whereby the action of undesirable torsion or angular momentum forces on the guide strand is prevented.

The take-up body may be designed in the form of a winding disk, in which case the possible linear control path is 3.14 times the diameter of the disk. But the take-up body may also consist of a cylinder permitting a plurality of circumferential contacts through the tension and compression element, with said cylinder being supported in an axially displaceable manner on its shaft. In such a case, it is possible to extend the linear control path to a multiple of the length that would otherwise be possible with a disk. The tube carrying the tension and compression element beyond the circular housing may thereby be correspondingly extended, and the flexible compression and tension element may be connected with a compression rod which in turn acts on the control element, thereby rendering possible either the direct remote actuation of the control element over an arbitrary control path, or the indirect actuation of such a control element by means of the addition of a Bowden cable.

BRIEF DESCRIPTION OF THE DRAWINGS

The invention is described in detail by way of preferred embodiments in reference to the drawings, wherein:

FIG. 2 is a cross-sectional view of the actuating device taken along line A—A of FIG. 1 with the cover plate screwed on;

DETAILED DESCRIPTION OF THE PREFERRED EMBODIMENT

Figure 1:
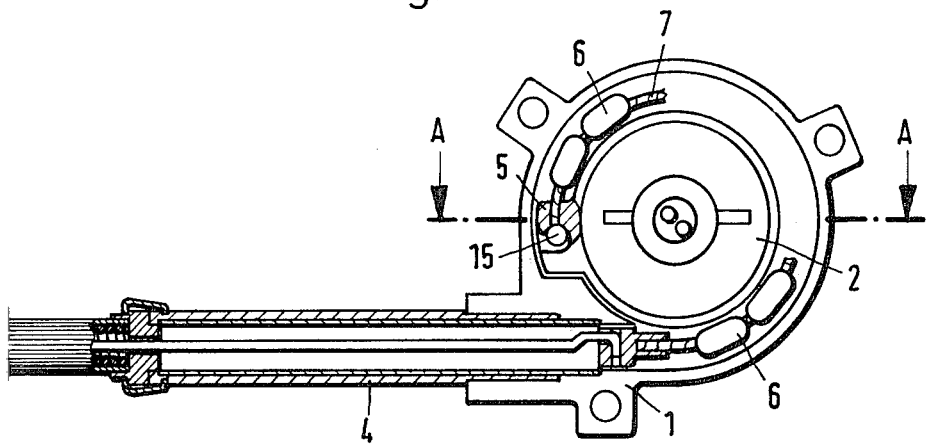
FIG. 1 shows a partially sectioned laterial elevation of the actuating device with the cover plate removed and the tension and compression element in the retracted position.
Figure 2:
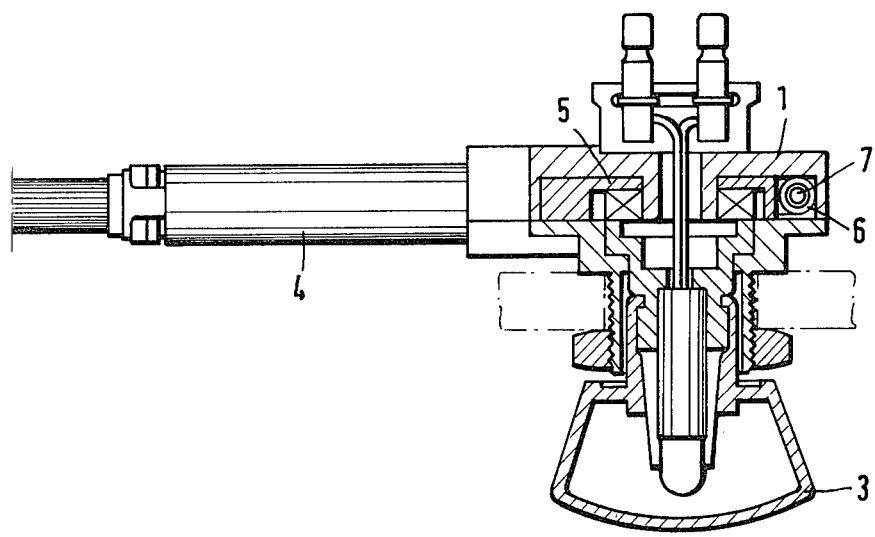
Figure 3:
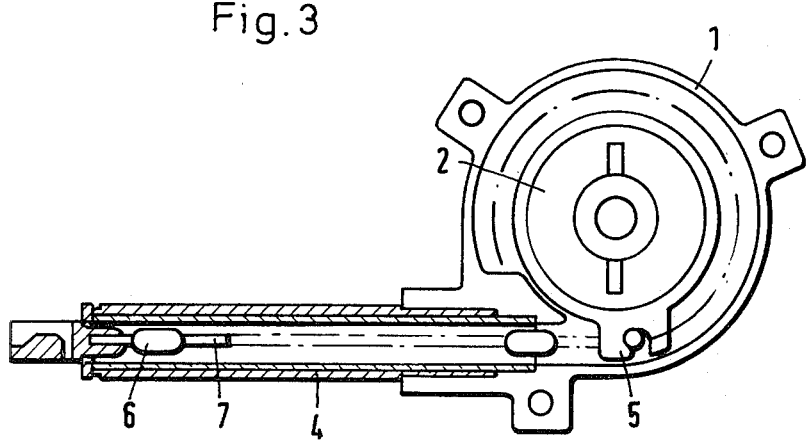
FIG. 3 is a view of the actuating element corresponding to FIG. 1 in the extended position of the tension and compression element.
Figure 5:
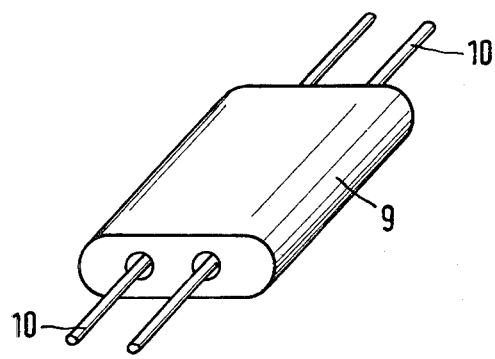
FIG. 5 is a perspective view of a cushion shaped compression body.
Figure 4:
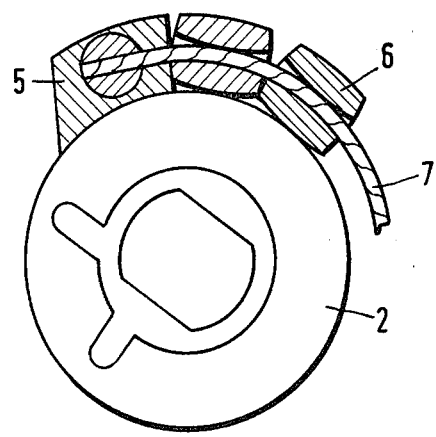
FIG. 4 shows an enlarged partial view of the take-up device with the tension and compression element using barrel-shaped pressure bodies.

In the actuating device as seen in FIGS. 1 and 2, the symbol 1 designates the essentially circular housing, and 2 designates the take-up body operable by means of a rotating knob 3. Between the take-up body and the housing 1 there is provided an annular space 15 which extends tangentially outward by means of a tube 4. The tension and compression element is attached to a pillow block 5, and is guided in the annular space 15 and the tube 4. The tension and compression element comprises an arbitrary number of successively arranged, elongatedly rounded pressure bodies 6, threaded in a freely sliding manner on a flexible guide strand 7. The pressure bodies 6 are packed tightly adjacent one another. In the example shown in FIG. 4, the pressure bodies 6 comprise cylindrical bodies which are rounded on all sides in the shape of a barrel. The rounded sides enable the adaptation of the cylindrical mantle surfaces of the bodies 6 to the round contours of the circular housing and further assures a frictionless sliding of adjacent cylindrical surfaces during the gliding of the bodies 6 from the circular path into the elongated path. Also in FIG. 4, it can be seen that each aperture 21 through which strand 7 is threaded is formed such that its diameter constantly increases smoothly from its longitudinal center toward the ends of the aperture such that strand 7 contacts the surface of the aperture along the entire length thereof when the associated body 6 is wound onto the takeup body. In another embodiment as shown in FIG. 5, the compression bodies may take the form of rectangular bodies 9 rounded on all of their surfaces in the manner of a pillow or cushion. This embodiment provides improved guidance and prevents the axial rotation of the compression bodies, thus enabling an arbitrary increase in the transmitted compressive force. Herein, in place of a single, centrally positioned flexible guide strand, two or more guide strands 10 are provided, which enable a corresponding increase in the tensile force.

Figure 6:
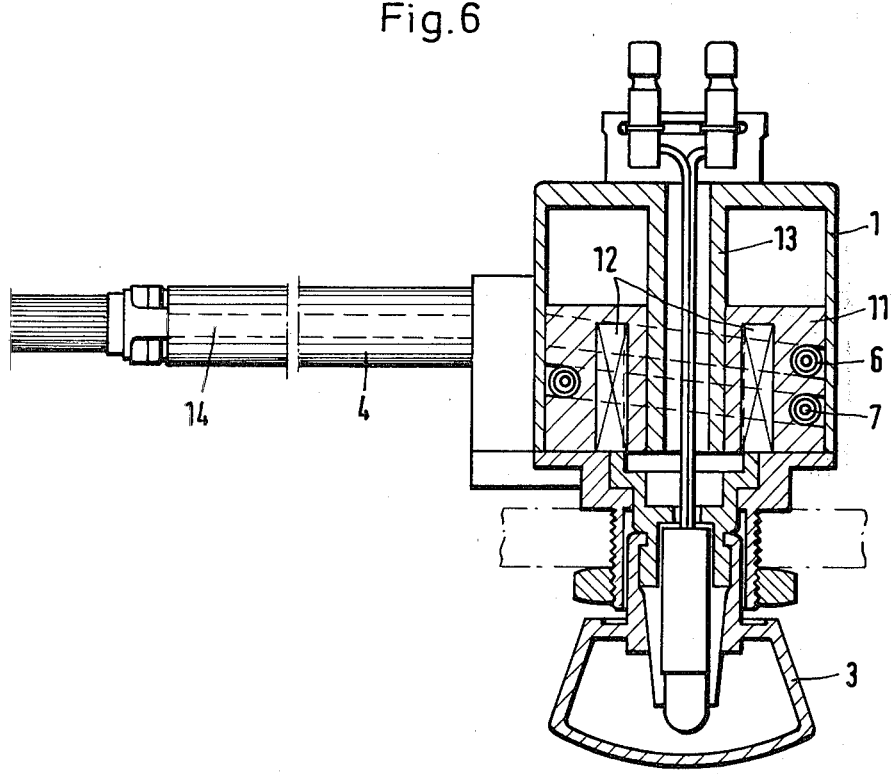
FIG. 6 illustrates an actuating device with multiple circumferential contacts on a cylindrical take-up body.

In the embodiment of FIGS. 1 and 2, the take-up body is designed as a winding disk. In another embodiment of the invention, as shown in FIG. 6, a cylinder 11 is provided which enables multiple circumferential contacts of the tensile and compression element. The cylinder is supported in an axially displaceable manner in the housing 1 and is operable by means of claws 12 engaging the cylinder. The sliding axis for the cylinder is designated by 13. In such a case, it is possible to extend the linear control path to a multiple of its length, as compared to the disk arrangement. The tube 4 guides the tension and compression element outside the housing. The tension and compression element may be connected with a compression rod 14 having its other end connected to the control element. In this manner, the compression rod may be guided in a fixed direction over a long path outside the tube 4. This form of the invention makes it possible for the direct remote control of high stroke, linear control elements by means of a rotating actuation.

Figure 7:
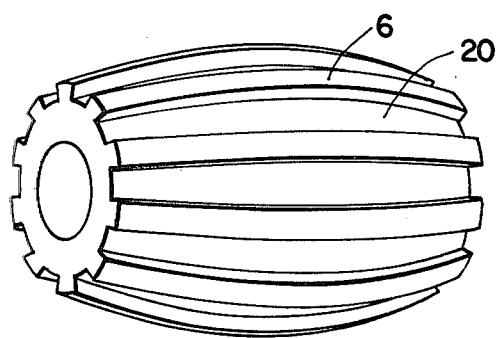
FIG. 7 illustrates a barrel shaped pressure body with longitudinal fluting.

In order to further reduce sliding friction inherent in the system between bodies 6 and the housing, the pressure bodies may be provided with longitudinal fluting. FIG. 7 shows a typical barrel shaped body 6 with fluting 20 formed longitudinally along the body.

While the present invention has been described with regard to particular embodiments, modifications may readily be made by those skilled in the art, and it is intended that the claims cover any such modifications which fall within the spirit and scope of the invention.

What is claimed is:

1. An actuation device for use with a linearly actuated control element, for example, a switching, regulating or steering element comprising:
    (a) a take-up body;
    (b) a housing enclosing said take-up body;
    (c) a shaft connected for rotating said take-up body, said shaft extending outwardly of said housing;
    (d) a flexible tension and compression element secured at one end thereof to said take-up body whereby said tension and compression element may be wound onto said take-up body or wound off of said take-up body, said tension and compression element comprising:
        (i) a flexible guide strand, and
        (ii) a plurality of elongated rounded pressure bodies, each pressure body having a longitudinal bore therethrough, each said longitudinal bore having a diameter which constantly increases smoothly from its longitudinal center to the ends of the bore for presenting a smoothly curved contact surface to said strand such that said strand contacts said bore along the entire length thereof when said tension and compression element is wound onto said take-up body, said pressure bodies being threaded onto said flexible guide strand and positioned closely adjacent one another to form a tight packing, and
    (e) a tube member, extending outwardly of said housing, said tube member enclosing at least a part of said tension and compression element during operation of said device, the other end of said tension and compression element adopted for operation of said linearly actuated control element in response to rotation of said shaft.

2. A device as recited in claim 1, characterized in that said pressure bodies consist of cylindrical bodies rounded on all sides in the manner of a barrel.

3. A device as recited in claim 1, characterized in that said pressure bodies consist of rectangular bodies rounded on all surfaces.

4. A device as recited in claim 1, characterized in that said pressure bodies are provided on their outer surfaces with longitudinal flutings.

5. A device as recited in claim 1, characterized in that the take-up body consists of a winding disk.

6. A device as recited in claim 1, characterized in that the take-up body consists of a cylinder operable in an axially displaceable manner on said shaft whereby multiple circumferential contacts of the tension and compression element are possible.

7. A device as recited in claim 1, characterized in that the tension and compression element is connected with a compression rod which is attached in turn for controlling said control element.

* * * * *